(12) United States Patent
Zens et al.

(10) Patent No.: US 11,781,657 B2
(45) Date of Patent: Oct. 10, 2023

(54) 3-2 WAY EXPANSION VALVE

(71) Applicant: HANON SYSTEMS, Daejeon (KR)

(72) Inventors: Daniel Zens, Kreuzau (DE); Toni Spies, Cologne (DE); Marc Graaf, Krefeld (DE); Dominik Wiechard, Cologne (DE); Markus Herzog, Bedburg (DE); Corinne Le Pellec, Pulheim (DE)

(73) Assignee: HANON SYSTEMS, Daejeon (KR)

( * ) Notice: Subject to any disclaimer, the term of this patent is extended or adjusted under 35 U.S.C. 154(b) by 4 days.

(21) Appl. No.: 17/693,363

(22) Filed: Mar. 13, 2022

(65) Prior Publication Data

US 2022/0196160 A1    Jun. 23, 2022

Related U.S. Application Data

(63) Continuation of application No. 15/873,444, filed on Jan. 17, 2018, now abandoned.

(30) Foreign Application Priority Data

Jan. 23, 2017   (DE) .......................... 102017101208.7

(51) Int. Cl.
| | | |
|---|---|---|
| *F16K 5/06* | (2006.01) | |
| *B60H 1/00* | (2006.01) | |
| *F16K 5/12* | (2006.01) | |
| *F16K 5/10* | (2006.01) | |
| *F16K 11/087* | (2006.01) | |

(52) U.S. Cl.
CPC ....... *F16K 5/0605* (2013.01); *B60H 1/00485* (2013.01); *B60H 1/00885* (2013.01); *B60H 1/00899* (2013.01); *F16K 5/10* (2013.01); *F16K 5/12* (2013.01); *F16K 11/0876* (2013.01)

(58) Field of Classification Search
CPC ..... B60H 1/00485; F16K 5/12; F16K 5/0605; F16K 11/0876
See application file for complete search history.

(56) References Cited

U.S. PATENT DOCUMENTS

| | | | | |
|---|---|---|---|---|
| 407,884 | A * | 7/1889 | Willing et al. | ........... F16K 5/12 137/625.12 |
| 3,735,956 | A * | 5/1973 | Matousek | ........... F16K 11/0876 137/454.6 |
| 4,131,125 | A * | 12/1978 | Tanguy | ................. B60T 13/148 137/118.06 |
| 5,983,937 | A * | 11/1999 | Makihara | ............ F24D 19/1015 251/207 |
| 2011/0120578 | A1 * | 5/2011 | Lockhart | ................ F25B 41/40 137/597 |

* cited by examiner

*Primary Examiner* — Reinaldo Sanchez-Medina
*Assistant Examiner* — Nicole Gardner
(74) *Attorney, Agent, or Firm* — McLean IP Global; Jason Y. Pahng

(57) ABSTRACT

A valve (1) is introduced for a heat pump system in a motor vehicle, with at least one inlet (3), at least two outlets (2, 4) and a valve element (7) which comprises at least one throughlet (8) and at least one expansion recess (9) that can be brought into fluidic connection with at least one outlet (2, 4).

7 Claims, 1 Drawing Sheet

3-2 WAY EXPANSION VALVE

CROSS-REFERENCE TO RELATED APPLICATIONS

This application is a continuation application of U.S. patent application Ser. No. 15/873,444, filed on Jan. 17, 2018. In addition, this application claims priority from and the benefit of German Patent Application No. 102017101208.7, filed on Jan. 23, 2017, the disclosures of which are hereby incorporated by reference in their entireties for all purposes as if fully set forth herein.

BACKGROUND

Field

The invention relates to a valve for a heat pump system in a motor vehicle.

Discussion of the Background

As is the case for many other interior spaces, the demand for the interior space of a motor vehicle is that it be air-conditioned to make it comfortable for its passengers. In this regard DE 197 47 548 A1 discloses a heating device for use in a motor vehicle and DE 192 53 357 A1 discloses a combined cooling system/heat pump for operation in motor vehicles. A generally utilizable flow control valve is disclosed in U.S. Pat. No. 5,524,863. While it is known for an air-conditioning system to provide a thermostatic expansion valve for the expansion of the refrigerant, there are additional requirements in heat pump.

SUMMARY

Against this background the objective of the invention is to provide a cost-effective and/or space-saving valve for a heat pump system.

This objective is attained through the valve described in patent claim 1. Accordingly, this valve comprises at least one inlet and at least two outlets as well as a valve element, in particular a single valve element that comprises at least one throughlet and at least one expansion recess which can be brought into fluidic connection with an outlet. Thereby that at least two outlets are provided, the refrigerant can be conducted in at least two directions which in efficient manner fulfills the functionality required for a heat pump. Moreover, according to the invention advantageously on the valve element at least one expansion recess, in particular an expansion slot is additionally provided, which can be brought into fluidic connection with one outlet, in two different positions advantageously with different outlets, such that the refrigerant is expandable into two different directions and, corresponding to the heat pump system, heating as well as also air-conditioning is feasible. The heating capacity is therewith improved. The valve according to the invention, which can be denoted as 3/2-way expansion valve, is of low complexity, fully fulfills the requirements and requires only small installation space. The throughlet can be referred to as "fully open" since the throughlet cross section corresponds approximately to that of the at least one inlet or outlet or the throughlet cross section is in any case markedly greater than that of the expansion recess.

Preferred further developments of the valve according to the invention are described in the further claims.

The valve according to the invention can advantageously comprise a closure position in which there is no fluidic connection between the inlet and any outlet such that a separate cutoff valve can be omitted saving cost and space.

An especially efficient utilization of the installation space is anticipated for that embodiment in which the completely opened throughlet describes an angle of substantially 90 degrees.

As already indicated, the expansion recess can advantageously be an expansion slot. Stated differently it can be a groove with preferably U-shaped cross section whose depth, starting from its docking to the throughlet cross section, preferably gradually decreases.

According to initial considerations advantageous properties of the valve according to the invention are expected especially when the valve element is a sphere. However, cylindrical implementation as well as those in the shape of a truncated cone are also feasible.

The form of the valve element is especially simply for that preferred implementation in which two outlets are essentially aligned with one another such that, by means of a rotation of the valve element about substantially 180° starting from a fluidic connection with the one outlet, the inlet can be brought into fluidic connection with the other outlet.

For a simple structure of the valve according to the invention it has further been found to be advantageous if a valve shaft connected with the valve element is essentially in alignment with the inlet.

BRIEF DESCRIPTION OF THE DRAWINGS

In the following an embodiment example of the invention depicted in the drawing will be explained in detail. Therein depict.

DETAILED DESCRIPTION OF THE ILLUSTRATED EMBODIMENTS

Figure 1:
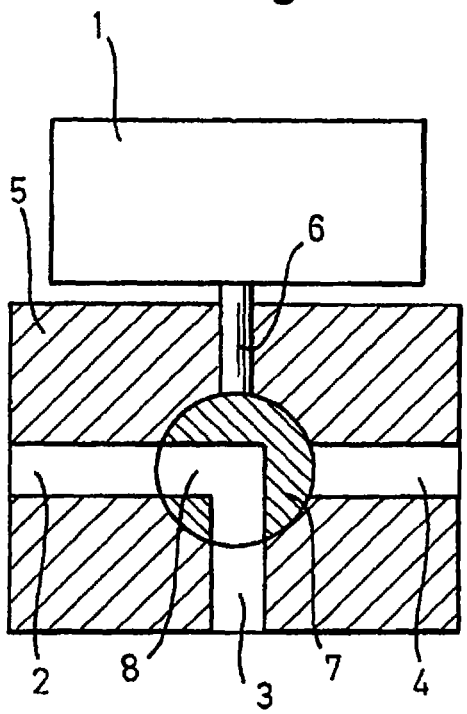
FIG. 1 a schematic representation of the valve according to the invention in a first position.

As is evident in FIG. 1, a valve element 7, in the depicted embodiment having the shape of a sphere, is actuatable by means of a valve shaft 6 through a rotary drive 1, which typically can be implemented as electric actuator or electric control element. The valve element 7 is received in a valve block 5 that comprises an inlet 3 and two outlets 2, 4. It should be stated that the outlets 2, 4 can also be used as an inlet and the inlet 3 can also be used as an outlet.

As is evident in FIG. 1, in the valve element 7 an angled, substantially L-shaped throughlet 8 is provided, whose cross section corresponds substantially to that of inlet 3 and/or outlet 2, 4. In the position shown in FIG. 1, consequently, a largely unimpeded throughflow of the refrigerant is possible. This applies equally to a position, not shown in the Figures, in which the valve element is rotated by 180° by means of the valve shaft 6 about a vertical axis, according to the Figures, such that the throughlet 8 is substantially directed toward the outlet 4.

Figure 2:
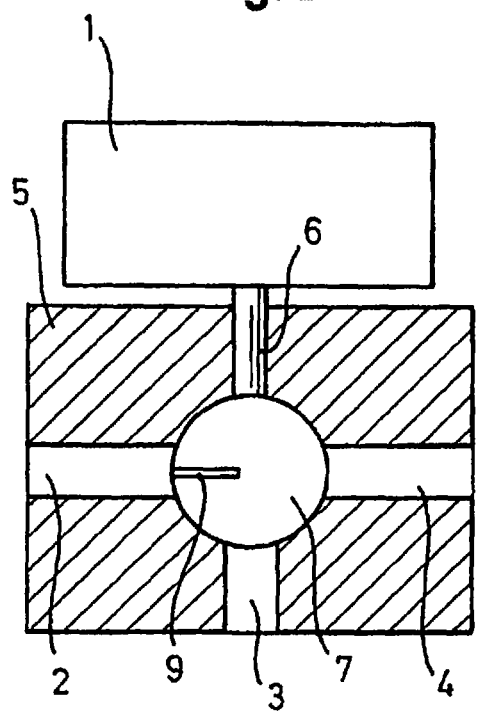
FIG. 2 a schematic representation of the valve according to the invention in a second position.

In contrast, in FIG. 2 a position is indicated in which the valve element 7, compared to the position shown in FIG. 1, has been rotated counterclockwise from a top view by 90°, in the direction of the viewer. The indicated expansion recess 9 comes into fluidic connection with the outlet 2, while the aperture, pointing according to the position of FIG. 1 to the outlet 2, of the valve element 7 is directed toward the viewer of FIG. 2, and is here in contact on an inner wall of the valve block 5 such that it is blocked. Accordingly, the refrigerant flowing in through the inlet 3 can only flow out through the expansion recess 9 and herein is expanded.

This applies equally, and advantageously suitably, to a heat pump system, in the direction of the other outlet 4 in that position which results from the position shown in FIG. 2 thereby that the valve element 7 is rotated about its axis by 180°. In this position the expansion recess 9 is in fluidic connection on the side facing away from the viewer of FIG. 2 with the outlet 4 and enables the expansion of the refrigerant in this direction.

Figure 3:
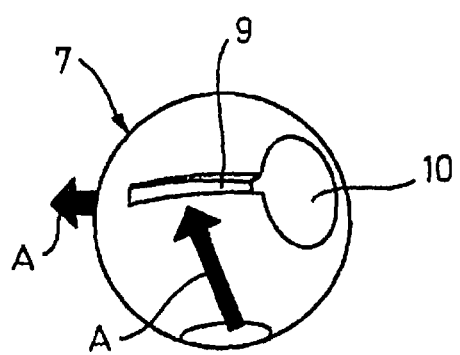
FIG. 3 a schematic representation of an embodiment of the valve element.

In FIG. 3 is depicted a practical embodiment of the, in this case, spherical valve element 7. The openings to the throughlet 8 in the example shown are substantially circular and the openings, essentially meeting in the center of the sphere, can be implemented by drilling. The expansion recess 9 is connected to one of the openings at its aperture which can be brought into fluidic connection with one of outlets 2, 4 and, at the site of the docking to the aperture, has a depth of a few millimeters. The cross section of the groove forming the expansion recess 9 is substantially rectangularly U-shaped, however it can also be V-shaped, rounded or formed in any other way.

The expansion recess 9 extends substantially in the plane which includes the axis of aperture 10 to which it is docked and approximately over a quarter circle along the circumference of the sphere. Its depth decreases continuously herein. Arrows A indicate that the refrigerant initially flows in the interior of the sphere according to FIG. 3 essentially in the vertical direction and subsequently laterally through the expansion element 9 toward the outside. In the depicted case the expansion recess 9 is consequently developed along the "equator" of the sphere from which also one of apertures 10 extends, while the aperture of the inlet 3 is implemented at a "pole". In particular when the expansion recess 9 extends less far along the circumference of the sphere, a completely closed position is possible thereby that the sphere, starting from the position shown in FIG. 2, is rotated toward the right until there is no longer a fluidic connection from the expansion recess 9 to the outlet 2 and aperture 10 has not yet come into fluidic connection with the outlet 4.

What is claimed is:

1. A valve for a heat pump system in a motor vehicle comprising:
   a rotary drive;
   a valve shaft;
   a valve block;
   a valve element being received in the valve block;
   the valve element being actuatable by the valve shaft through the rotary drive;
   the valve block including an inlet, a first outlet and a second outlet, wherein the first outlet and the second outlet are positioned opposed to each other;
   the inlet of the valve block being positioned opposed to the rotary drive;
   the valve element including an L-shaped throughlet wherein the valve element does not include a substantially straight passage which pass through a center of the valve element to allow passage from one end of the valve element to an opposing end of the valve element;
   the valve element including an expansion recess connected at an opening of the throughlet;
   the expansion recess extending away from the opening of the throughlet and in a plane defined as being perpendicular to the valve shaft;
   the expansion recess being in the form of a groove;
   the cross section of the groove of the expansion recess being substantially V-shaped or rectangularly U-shaped;
   a depth of the groove of the expansion recess being continuously decreased away from the opening of the throughlet;
   the depth of the groove of the expansion recess being decreased to zero at approximately a quarter circle, along the circumference of the valve element, away from the opening of the throughlet;
   the expansion recess extending approximately a quarter circle along the circumference of the valve element wherein the expansion recess does not extend more than a quarter circle along the circumference of the valve element and the expansion recess does not extend less than approximately a quarter circle along the circumference of the valve element;
   wherein the valve element can be rotated to be in a closed position where there is no longer a fluidic connection between any one of the inlet, the first outlet, and the second outlet to any one of the inlet, the first outlet, and the second outlet because the expansion recess does not extend more than a quarter circle along the circumference of the valve element; and
   wherein the valve element can be rotated to be in an open position which allows one passage between the inlet and only one of the first and second outlets because the expansion recess does not extend more than approximately a quarter circle along the circumference of the valve element.

2. A valve for a heat pump system in a motor vehicle comprising:
   a rotary drive;
   a valve shaft;
   a valve block;
   a valve element being received in the valve block;
   the valve element being actuatable by the valve shaft through the rotary drive;
   the valve block including an inlet, a first outlet and a second outlet, wherein the first outlet and the second outlet are positioned opposed to each other;
   the inlet of the valve block being positioned opposed to the rotary drive;
   the valve element including an L-shaped throughlet wherein the valve element does not include a substantially straight passage which pass through a center of the valve element to allow passage from one end of the valve element to an opposing end of the valve element;
   the throughlet including a throughlet inlet and a throughlet outlet;
   the valve element including an expansion recess, including an expansion recess length, connected at the throughlet outlet;
   the expansion recess extending away from the opening of the throughlet and in a plane defined as being perpendicular to the valve shaft;
   the expansion recess being in the form of a groove including a groove width and a groove depth;
   the cross section of the groove of the expansion recess being substantially V-shaped or rectangularly U-shaped;

the groove depth of the expansion recess being continuously decreased away from the throughlet outlet while the groove width stays substantially constant throughout the expansion recess;

the groove depth of the expansion recess being decreased to zero at approximately a quarter circle, along the circumference of the valve element, away from the opening of the throughlet;

the expansion recess extending approximately a quarter circle along the circumference of the valve element wherein the expansion recess does not extend more than approximately a quarter circle along the circumference of the valve element;

wherein the valve element can be rotated to be in a closed position where there is no longer a fluidic connection between any one of the inlet, the first outlet, and the second outlet to any one of the inlet, the first outlet, and the second outlet;

wherein the valve element can be rotated to be in an open position which allows only one passage from the inlet to either one of either the first outlet or the second outlet;

wherein the valve element, under any rotation position, never allows more than one passage from the inlet to either one of the first outlet or the second outlet; and wherein while the throughlet outlet is completely blocked by an inner wall of the valve block in the open position:
the one allowed passage is formed by the cross section of the groove meeting either one of the first outlet and the second outlet, and
rotation of the valve element can change the groove depth of the one allowed passage formed by the groove to be in a range of zero to maximum value of the groove depth of the groove of the expansion recess, which results in precision control of the valve.

3. The valve according to claim 2, wherein rotation of the valve element in an amount corresponding to length of the expansion recess extending along the circumference of the valve element can directly proportionally change the groove depth of the one allowed passage formed by the groove to go from zero to maximum value of the groove depth of the groove of the expansion recess, because the groove width stays substantially constant.

4. The valve according to claim 3, wherein cross section of the throughlet outlet is markedly greater than that of the cross section of groove of the expansion recess, which results in the precision control of the valve.

5. A valve for a heat pump system in a motor vehicle comprising:
a rotary drive;
a valve shaft;
a valve block;
a valve element being received in the valve block;
the valve element being actuatable by the valve shaft through the rotary drive;
the valve block including an inlet, a first outlet and a second outlet, wherein the first outlet and the second outlet are positioned opposed to each other;
the inlet of the valve block being positioned opposed to the rotary drive;
the valve element including an L-shaped throughlet wherein the valve element does not include a substantially straight passage which pass through a center of the valve element to allow passage from one end of the valve element to an opposing end of the valve element;
the throughlet including a throughlet inlet and a throughlet outlet;
the valve element including an expansion recess, including an expansion recess length, connected at the throughlet outlet;
the expansion recess extending away from the opening of the throughlet and in a plane defined as being perpendicular to the valve shaft;
the expansion recess being in the form of a groove including a groove width and a groove depth;
the cross section of the groove of the expansion recess being substantially V-shaped or rectangularly U-shaped;
the groove depth of the expansion recess being continuously decreased away from the throughlet outlet while the groove width stays substantially constant;
the expansion recess extending approximately a quarter circle along the circumference of the valve element wherein the expansion recess does not extend more than a quarter circle along the circumference of the valve element;
wherein the valve element can be rotated to be in a closed position where there is no longer a fluidic connection between any one of the inlet, the first outlet, and the second outlet to any one of the inlet, the first outlet, and the second outlet;
wherein the valve element can be rotated to be in an open position which allows only one passage from the inlet to either one of either the first outlet or the second outlet;
wherein the valve element, under any rotation position, never allows more than one passage from the inlet to either one of the first outlet or the second outlet; and
wherein while the throughlet outlet is completely blocked by an inner wall of the valve block in the open position:
the one allowed passage is formed by the cross section of the groove meeting either one of the first outlet and the second outlet, and
rotation of the valve element can change the groove depth of the one allowed passage formed by the groove to correspond to entire range of the groove depth of the groove of the expansion recess, which results in precision control of the valve.

6. The valve according to claim 5, wherein rotation of the valve element in an amount corresponding to length of the expansion recess extending along the circumference of the valve element can directly proportionally change the groove depth of the one allowed passage formed by the groove to go from minimum value to maximum value of the groove depth of the groove of the expansion recess, because the groove width stays substantially constant.

7. The valve according to claim 6, wherein cross section of the throughlet outlet is markedly greater than that of the cross section of groove of the expansion recess, which results in the precision control of the valve.

* * * * *